(12) United States Patent
Pathak et al.

(10) Patent No.: US 11,894,679 B2
(45) Date of Patent: Feb. 6, 2024

(54) METHODS, DEVICES, AND SYSTEMS FOR DISTRIBUTED MONITORING BASED ADAPTIVE DIAGNOSIS OF POWER ANOMALIES IN A POWER NETWORK

(71) Applicant: Eaton Intelligent Power Limited, Dublin (IE)

(72) Inventors: Saurabh Pathak, Bahraich District (IN); Fiaz Shaik, Macherla (IN); Saiful Haq, Lucknow (IN); Vaibhav S. Devalalikar, Barshi (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 346 days.

(21) Appl. No.: 17/074,082

(22) Filed: Oct. 19, 2020

(65) Prior Publication Data

US 2022/0123552 A1 Apr. 21, 2022

(51) Int. Cl.
*H02J 3/00* (2006.01)
*H02J 13/00* (2006.01)
*H04L 67/12* (2022.01)

(52) U.S. Cl.
CPC ........ *H02J 3/001* (2020.01); *H02J 13/00002* (2020.01); *H02J 13/00012* (2020.01); *H04L 67/12* (2013.01)

(58) Field of Classification Search
CPC ................. H02J 3/001; H02J 13/00002; H02J 13/00012; H02J 13/0004; H02J 3/0012; H04L 67/12; Y02E 60/00; Y04S 10/20; Y04S 10/30; G06Q 50/12; H02H 1/0092; H02H 7/26
See application file for complete search history.

(56) References Cited

U.S. PATENT DOCUMENTS

| 8,738,334 B2 | 5/2014 | Jiang et al. | |
| 9,292,888 B2 | 3/2016 | An et al. | |
| 9,948,521 B2 * | 4/2018 | Doraiswamy | ........... H04L 49/40 |
| 10,386,820 B2 | 8/2019 | Wenzel et al. | |
| 2009/0289776 A1 * | 11/2009 | Moore | ................. G06Q 20/352 340/10.41 |
| 2010/0134257 A1 * | 6/2010 | Puleston | .............. G06K 7/0008 340/10.4 |
| 2010/0332373 A1 * | 12/2010 | Crabtree | ................ G06Q 40/04 709/224 |

(Continued)

OTHER PUBLICATIONS

"International Search Report and Written Opinion of the International Searching Authority", International Application No. PCT/EP2021/025400, dated Feb. 1, 2022, 13 pp.

*Primary Examiner* — Ziaul Karim
(74) *Attorney, Agent, or Firm* — Eckert Seamans Cherin & Mellott, LLC

(57) ABSTRACT

Methods, devices and systems for detecting an anomaly in a power network are described. A method for detecting an anomaly in a power network includes determining a baseline power usage in the power network, receiving data indicative of an active power usage in the power network, detecting an anomaly based on a difference between the baseline power usage and the active power usage, isolating a fault for an element in the power network, responsive to detecting the anomaly, and transmitting fault isolation information indicating the fault to a user device. Related devices and systems may perform operations of the method described herein.

11 Claims, 14 Drawing Sheets

(56) References Cited

U.S. PATENT DOCUMENTS

| | | | | |
|---|---|---|---|---|
| 2013/0201316 A1* | 8/2013 | Binder | ............... | H04L 67/12 |
| | | | | 701/2 |
| 2015/0346717 A1* | 12/2015 | Hosek | ............ | G06F 11/2257 |
| | | | | 702/183 |
| 2019/0024928 A1 | 1/2019 | Li et al. | | |
| 2019/0347577 A1* | 11/2019 | Ba | ..................... | G06N 20/00 |

\* cited by examiner

METHODS, DEVICES, AND SYSTEMS FOR DISTRIBUTED MONITORING BASED ADAPTIVE DIAGNOSIS OF POWER ANOMALIES IN A POWER NETWORK

FIELD

Various embodiments described herein relate to devices, methods, and systems for a power network and more particularly to adaptive diagnosis of power anomalies in a power network.

BACKGROUND

A typical facility such as a Data Center or a manufacturing plant consumes a substantial amount of energy during daily activities. A large facility often has hundreds of devices and subsystems which each have different power demand and consumption patterns according to their functional relevance. A facility often operates in multiple shifts throughout the day and/or at night, which places variable energy demands on the power grid depending on the type of production activities, the devices involved, environmental factors such as temperature, and/or the intensity/rate of production desired and achievable during operation.

SUMMARY

Various embodiments of the present invention are directed to a method for detecting an anomaly in a power network. The method includes determining a baseline power usage in the power network, receiving an active power usage in the power network, detecting an anomaly based on a difference between the baseline power usage and the active power usage, isolating a fault for an element in the power network, responsive to detecting the anomaly, and transmitting fault isolation information indicating the fault to a user device. The element is at a lower level hierarchy of the power network than the anomaly.

According to some embodiments, isolating the fault may include identifying a main anomaly in a first element of a main meter hierarchy of the power network that includes a plurality of first elements, searching for a lower anomaly in a plurality of second elements of the lower level hierarchy that is lower than the main meter hierarchy, where the plurality of second elements are associated with the first element, and identifying a second element of the plurality of second elements associated with the lower anomaly.

According to some embodiments, the lower anomaly may include a first lower anomaly, and the lower level hierarchy includes a first lower level hierarchy. The method for detecting an anomaly in a power network may include searching for a second lower anomaly in a plurality of third elements of a second lower level hierarchy, where the plurality of third elements are associated with the second element, and identifying a third element of the plurality of third elements associated with the second lower anomaly. The second lower level hierarchy is at a lower level in the power network than the first lower level hierarchy.

According to some embodiments, detecting the anomaly may include identifying an outlier in the active power usage, responsive to the active power usage being outside of a predetermined range of the baseline power usage, and determining that the outlier includes the anomaly in the power network. The method may include determining a feedback based on the anomaly, and modifying the baseline power usage based on the feedback.

According to some embodiments, determining the feedback based on the anomaly may include generating data related to the active power usage and the anomaly, and triggering generation of the feedback based on the data related to the active power usage and the anomaly. Determining the feedback based on the anomaly may include providing information related to the anomaly to a user of the power network, receiving an input from the user, and determining the feedback based on the input from the user.

According to some embodiments, determining the feedback based on the anomaly may include monitoring the active power usage over a time period, determining a shift in properties of the active power usage over the time period, and determining the feedback based on the shift in properties of the active power usage over the time period. The element may include a building, a section, a machine, or a component.

According to some embodiments, the method may include determining an anomaly type and/or severity of the anomaly. The anomaly type may be associated with a repair action taken, responsive to the isolating the fault. The severity of the anomaly may be obtained from a database that includes historical power usage data of the power network. Detecting the anomaly based on the difference between the baseline power usage and the active power usage may include predicting expected power usage in a future time period based on historical power usage data, generating an uncertainty bound for the expected power usage that was predicted, and detecting the anomaly, responsive to the active power usage being outside of the uncertainty bound.

According to some embodiments, the active power usage may include a first active power usage in a first time period. The method may include determining a second active power usage in a second time period that is after the first time period, and modifying the baseline power usage, responsive to both the first active power usage and the second active power usage being outside of the uncertainty bound. The expected power usage may be predicted based on determining a temporal pattern in the historical power usage data. The method may include determining if the fault is related to a previous anomaly that was reported, and reporting the fault when the fault is not related to the previous anomaly that was reported.

Various embodiments of the present invention are directed to a device configured to detect an anomaly in a power network. The device includes a baseline power usage circuit configured to determine a baseline power usage in the power network, an active power usage circuit configured to determine an active power usage in the power network, an anomaly detection circuit configured to detect an anomaly based on a difference between the baseline power usage and the active power usage, a fault isolation circuit configured to isolate a fault for an element in the power network, responsive to detecting the anomaly, and a transmitter configured to transmit fault isolation information indicating the fault to a user device. The element is at a lower level hierarchy of the power network than the anomaly.

According to some embodiments, the fault isolation circuit may include a main anomaly detection circuit configured to identify a main anomaly in a first element of a main meter hierarchy of the power network, where the main meter hierarchy includes a plurality of first elements, a lower anomaly detection circuit configured to search for a lower anomaly in a plurality of second elements of the lower level hierarchy that is lower than the main meter hierarchy and identify a second element of the plurality of second elements associated with the lower anomaly, where the plurality of second elements are associated with the first element.

According to some embodiments, the lower anomaly may include a first lower anomaly, and the lower level hierarchy may include a first lower level hierarchy. The fault isolation circuit may further include a second lower anomaly detection circuit configured to search for a second lower anomaly in a plurality of third elements of a second lower level hierarchy and identify a third element of the plurality of third elements associated with the second lower anomaly. The second lower level hierarchy is at a lower level in the power network than the first lower level hierarchy, and the plurality of third elements are associated with the second element. The device further may include a database that includes historical power usage data, a prediction circuit configured to predict expected power usage in a future time period based on the historical power usage data, and an uncertainty bound generator configured to generate an uncertainty bound for the expected power usage that was predicted. The anomaly detection circuit may be further configured to detect the anomaly, responsive to the active power usage being outside of the uncertainty bound.

According to some embodiments, the device may include a feedback circuit configured to determine a feedback based on the anomaly. The baseline power usage circuit may be further configured modify the baseline power usage based on the feedback.

Various embodiments of the present invention are directed to a power network including an anomaly detection device. The anomaly detection device includes a baseline power usage circuit configured to determine a baseline power usage in the power network, an active power usage circuit configured to determine an active power usage in the power network, an anomaly detection circuit configured to detect an anomaly based on a difference between the baseline power usage and the active power usage, and a fault isolation circuit configured to isolate a fault for an element in the power network, responsive to detecting the anomaly. The anomaly detection device includes a reporting device including a transmitter configured to provide an indication of the fault to a display device. The element is at a lower level hierarchy of the power network than the anomaly.

Further features, advantages and details of the present invention will be appreciated by those of ordinary skill in the art from a reading of the figures and the detailed description of the preferred embodiments that follow, such description being merely illustrative of the present invention.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Figure 1:
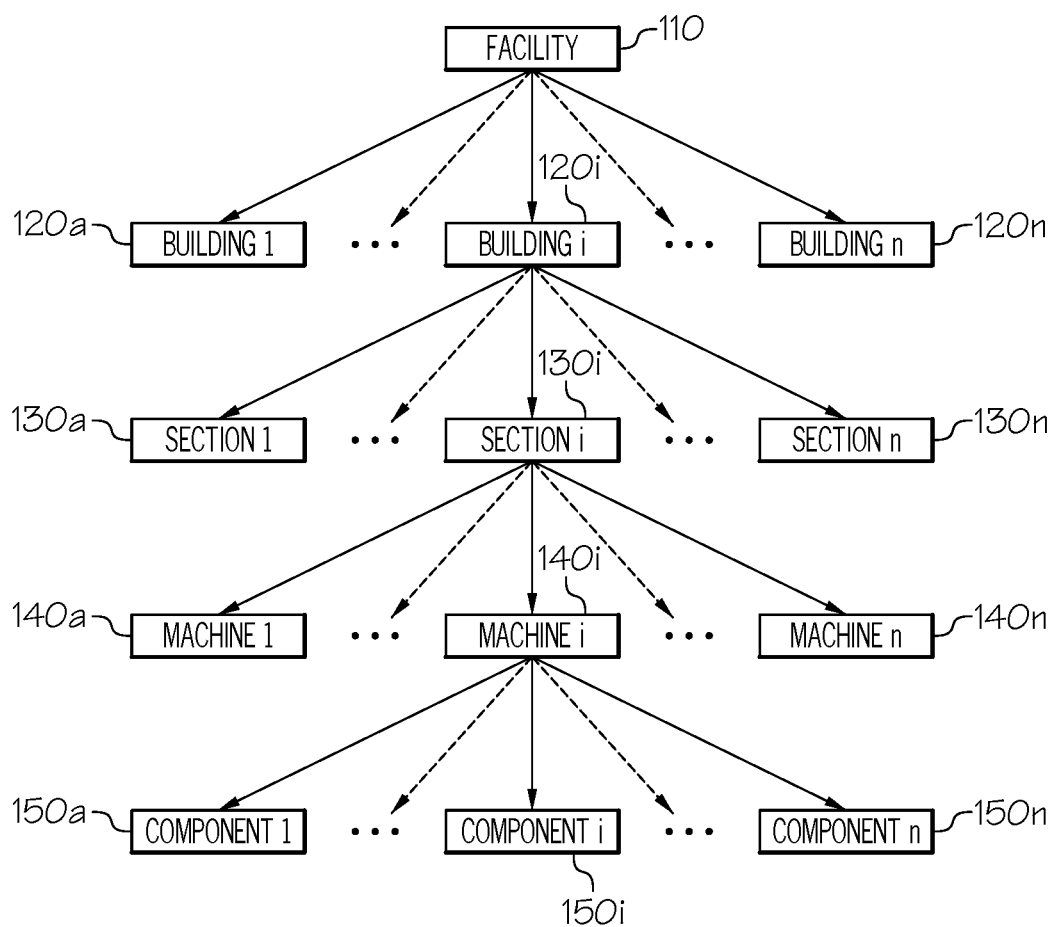
FIG. 1 illustrates a power metering hierarchy, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

In the drawings, the relative positions, connections, or features may be exaggerated for clarity. This invention may, however, be embodied in many different forms and should not be construed as limited to the embodiments set forth herein. Rather, these embodiments are provided so that this disclosure will be thorough and complete, and will fully convey the scope of the invention to those skilled in the art.

A power network may include a facility such as a data center or a manufacturing plant that has substantial power demands. The facility may include a variety of devices or elements that each operate based on various electrical power. The variety of devices in the facility may be arranged in a hierarchical structure. For example, as illustrated in FIG. 1, a facility such as a data center or manufacturing plant may include several buildings, each of which may have unique power needs. Each building may be partitioned into various sections that have differing power needs. Each section may include a variety of machines, which further may each include a variety of components. Referring to FIG. 1, a facility 110 may include a plurality of buildings 120*a* to 120*n*. Each building may include a plurality of sections 130*a* to 130*n*. Each section may include a plurality of machines 140*a* to 140*n*. Each of the machines may include components 150*a* to 150*n*. As an example, in a data center, sections 130*a* to 130*n* may each be a group of servers such that a group of servers is assigned to one customer. Machines 140*a* to 140*n* may be individual servers, IT racks, chillers, compressors, or supporting equipment. Components 150*a* to 150*n* could be components of, for example a chiller, such as a fan, compressor, evaporator, etc.

In the example hierarchy shown in FIG. 1, each hierarchical level and subsequent elements in the hierarchical levels may have different power demand and consumption patterns according to their functional relevance. The facility may operate in various shifts throughout the day and/or night, placing variable power demands on the power grid depending on the types of production activities, the devices that are operating, and the intensity and/or rate of production at a given time. The hierarchy of FIG. 1 is intended to represent a non-limiting example such that a fewer number or a greater number of hierarchy levels are possible without deviating from the scope of the various embodiments.

Various embodiments described herein may arise from recognition that anomalies in the power network may indicate faults that need to be detected and isolated within the hierarchical structure. Anomalies may be identified at multiple levels in the power network hierarchy, as will be discussed with respect to various embodiments described herein. Power anomaly detection in facilities such as data centers, factories, plants, commercial buildings, etc. is described herein. The power network may learn power consumption patterns typical of a given facility and discern deviations from the typical patterns. The power network may identify the location of such power anomalies in the facility metering hierarchy. The power anomaly detection may occur at multiple levels in the facility power chain hierarchy, from individual machine, component, or subsystem level to an entire facility level. Once a power anomaly has been detected, a subsequent reporting mechanism may trigger a notification along with the probable origin of anomaly to provide fault isolation. The system may recommend an action to be taken to mitigate the fault. At the end of the cycle, the system may attempt to improve performance by explicit and/or implicit feedback mechanisms.

An anomaly may occur when the power usage deviates from normal or baseline power usage. Anomalies in a power consumption pattern at a machine/section/facility are often the result of faulty machine parts, operator errors, or failed/degrading electrical components. Failing to diagnose an anomaly, assessing severity, or isolating the faults that cause the anomaly may lead to increased energy bills, reduced productivity, unplanned down time, and/or safety related incidents. Thus, it is important in a facility to diagnose power anomalies in real time in order to take corrective actions.

Anomaly detection for homes and commercial buildings may occur by reading a power meter for the entire building. Power monitoring and anomaly detection based on a single power meter at the building level of hierarchy may suffer from limitations such as low detection rates, a high number of false alarms, limited isolation ability, and/or a lack of recommended corrective actions. Reading power meters at a single hierarchical level, such as for an entire building, may produce a low rate of detection of power anomalies since thresholds such as lower and upper control limits may be used which miss contextual anomalies and/or slow degradation between control limits. Power meters at a single hierarchical level may produce a high number of false alarms since power consumed in a facility depends on power usage patterns, weather patterns at the location, operation schedule/shifts, process flow information, functional characteristics of machines involved in production, and/or types of computational resources under use at a given time. A high number of false alarms may be a significant nuisance to an end customer or user that utilizes the power network to supply power to their facility. Power meters at a single hierarchical level may offer limited isolation of faults. When monitoring at the facility level, it is difficult to isolate anomalies occurring in a lower level of the hierarchy such as a building/section/machine of the facility due to lack of downstream information. Power meters at a single hierarchical level may not provide enough information to recommend corrective actions to improve power performance of individual elements. Recommendations for corrective action would avoid increased power bills, productivity losses, or unplanned downtime.

Additional challenges for anomaly detection in facilities may be due to power consumption varying seasonally and other variances in power consumption. For example, the power consumed in a given time depends not only on the seasonally varying loads such as lighting and HVAC, but also on non-seasonal factors such as demand for production which may make identifying seasonal patterns of the power consumption difficult. In comparison with residential and commercial building sectors, the power consumption in industrial settings may have a high variance due to different types of loads with varying energy characteristics and the non-seasonal factors controlling their operation. These variances may pose challenges for anomaly detection since anomalies may be attributed to variances in the data. Therefore, anomaly detection techniques may need to be robust by using available contextual information.

According to various embodiments described herein, data-driven techniques are applied to learn the normal power consumption behaviors of devices, components, machines, sections, buildings, and facilities. The acquired knowledge regarding power consumption activities may be used to detect deviations from behavior during a facility's daily operations, thus classifying and/or identifying a potential power anomaly in a power network. Procedures for anomaly detection may attempt to identify the location of the anomaly. Subsequently, fault isolation in the metering hierarchy may be provided. A potential solution to address a detected anomaly may be recommended. Various embodiments described herein may employ direct and indirect feedback mechanisms to analyze whether the flagged behavior has been corrected. Such feedback may be helpful in adaptive learning.

Adaptive learning may be needed due to the dynamic nature of the underlying processes which consume power. In this respect, the feedback mechanism may close the loop such that learning of the power system behavior occurs when it is observed that the flagged anomaly is a part of normal operation under current circumstances. Using feedback information, the power network may be able to autonomously correct itself to recognize similar future occurrences of behavior patterns as being normal. This feedback mechanism, however, may be separate from the primary learning mechanism of the operations described herein, which learn a baseline power usage behavior of the facility from historical data. In some embodiments, the adaptive learning mechanism may augment the baseline power usage behavior during online operation of the system.

To address the aforementioned challenges for detecting anomalies in a power network, various embodiments describe operations for detecting anomalies and isolating faults in a power network. In addition to the electrical power consumption data, process data which may include information about variations such as non-seasonal variations may be utilized. For example, non-seasonal variations in power usage may include the production rate of a factory that depends on business requirements or utilization patterns on the servers of a data center. According to various embodiments described herein, anomaly detection in high variance power data, due to sensitivity to contextual features, may need to capture the variance information adequately. For example, by utilizing the production rate data, it may be possible to model expected variations in these contexts based on historical data. Deviations from historical data in these contexts may be successfully identified and reported as an anomaly in the power network.

Figure 2:
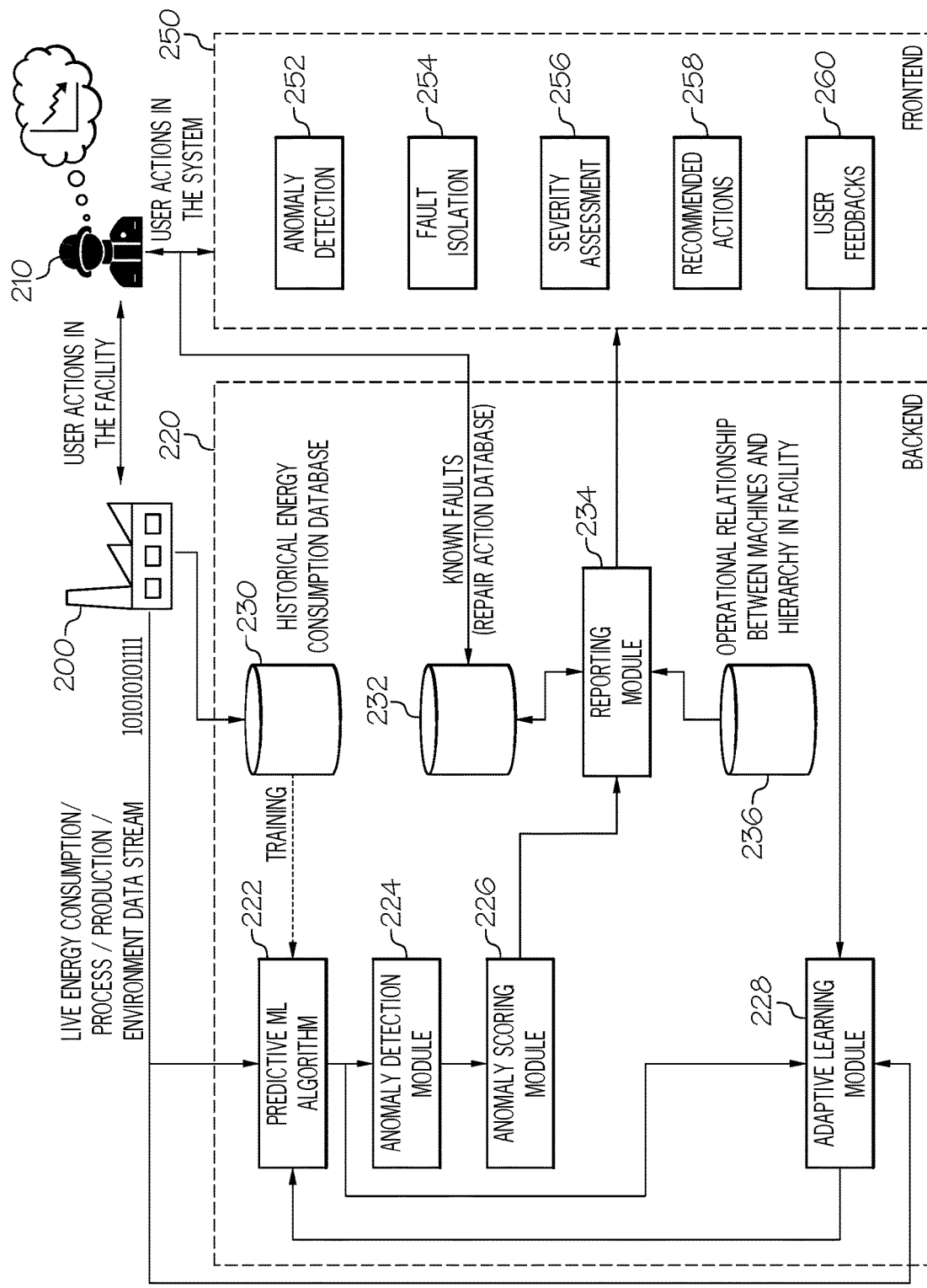
FIG. 2 is a block diagram of anomaly detection in a power network, according to various embodiments described herein.

FIG. 2 is a block diagram of anomaly detection in a power network, according to various embodiments described herein. Referring now to FIG. 2, a facility 200 in a power network includes various elements that consume power. Anomaly detection may be accomplished using an Internet of Things (IoT) architecture or an on-premise architecture such as a private cloud deployed within the data center. Information or data regarding live power consumption, processes, production, and environment associated with the facility 200 may be provided to one or more anomaly detection devices that include one or more processors for determining anomalies in the power network. The anomaly detection system may include backend processing 220 and frontend processing 250. Data associated with the facility 200 may be provided to a predictive machine learning module 222 and/or to a historical energy consumption database 230. The historical energy consumption database 230 may store information regarding power consumption of the facility 200 over time and provide this information as training information to the predictive machine learning module 222.

The predictive machine learning module 222 may generate a time series prediction model. The predictive machine learning module 222 may provide process data to the anomaly detection module 224. The anomaly detection module 224 identifies potential anomalies in the power data and provides this information to an anomaly scoring module 226. The anomaly scoring module 226 may quantify how far the current active power usage is from a baseline power usage. The active power is related to the actual power that is consumed by the customer devices and/or equipment. The baseline power may be the expected or predicted power. The anomaly scoring module 226 may detect an anomaly based on the difference between baseline power usage and the active power usage by, for example, weighting various factors or statistical differentiation. According to some embodiments, the baseline power usage may come from the prediction model, whereas the active/actual power consumption comes from sensors associated with power metering. The anomaly scoring module 226 may provide an identified anomaly or an indication of a fault to reporting module 234. The reporting module 234 may access database 236 to obtain operational relationships between machines and/or other elements in the hierarchy of power distribution of the facility 200. The adaptive learning module 228 may receive information from the predictive machine learning module 222 and/or other data related to facility 200. In some embodiments, the adaptive learning module 228 may receive user feedback from a user feedback module 260. The adaptive learning module 228 may utilize data from the predictive machine learning module 222, data regarding facility power usage, and/or user feedback from user feedback module 260 to provide feedback to the predictive machine learning module 222. The predictive machine learning module 222 may utilize this feedback to adapt operations for the determination of anomalies in the power network.

Still referring to FIG. 2, a user 210 may take actions that affect the power usage of facility 200. The user 210 may obtain information from the front end 250 of the power network and provide input to guide the operation of the power network. The frontend 250 may include a display and/or other indicators that provide anomaly detection information 252, fault isolation information 254, severity assessment 256, and/or recommended actions 258. The input provided by the user 210 in response to particular anomalies may be stored in a database to aid in making future recommendations upon detecting faults.

Figure 3A:
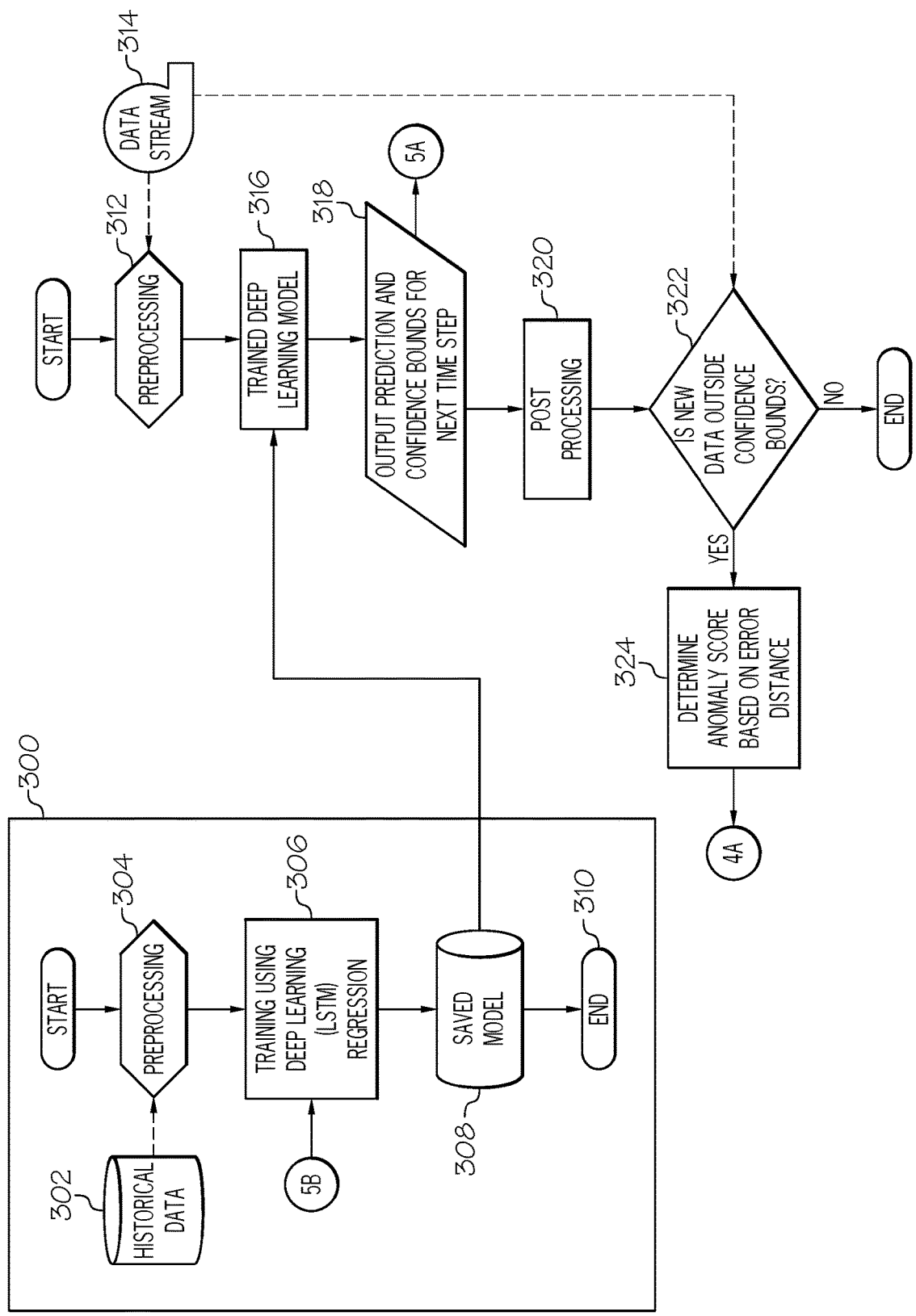
FIGS. 3A to 3C are a flowchart of operations for detecting an anomaly in a power network, according to various embodiments described herein.
Figure 3B:
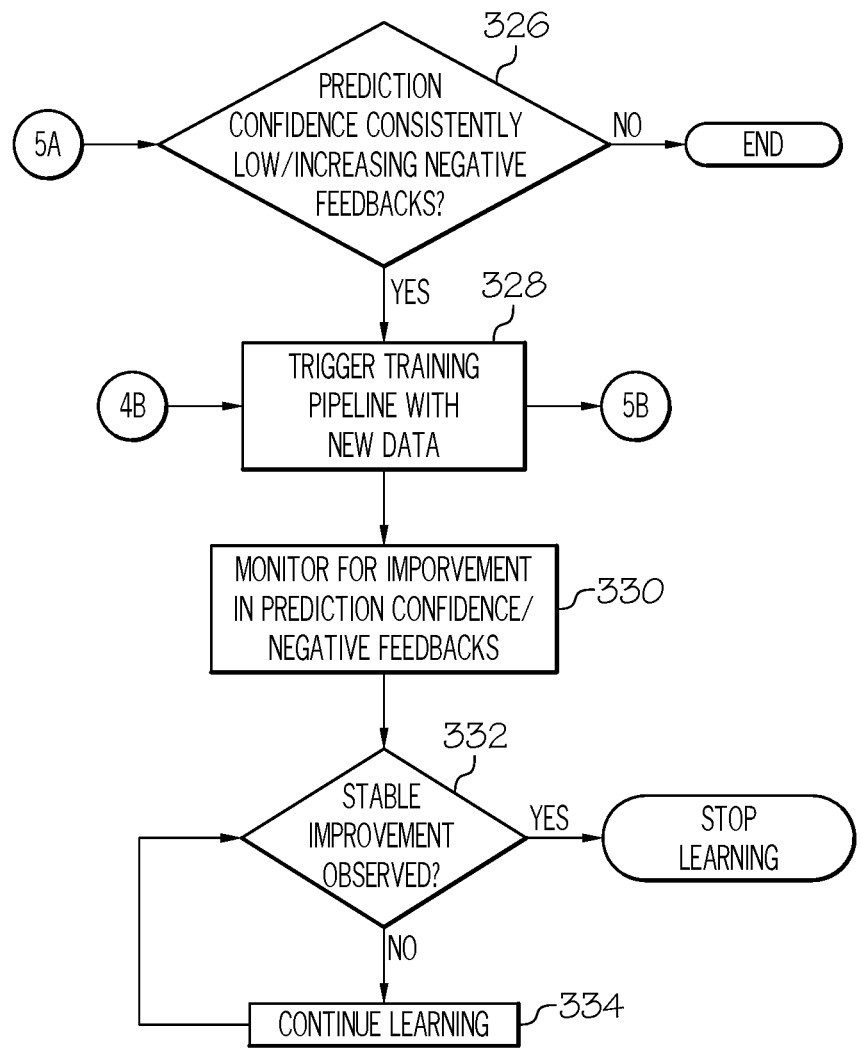
Figure 3C:
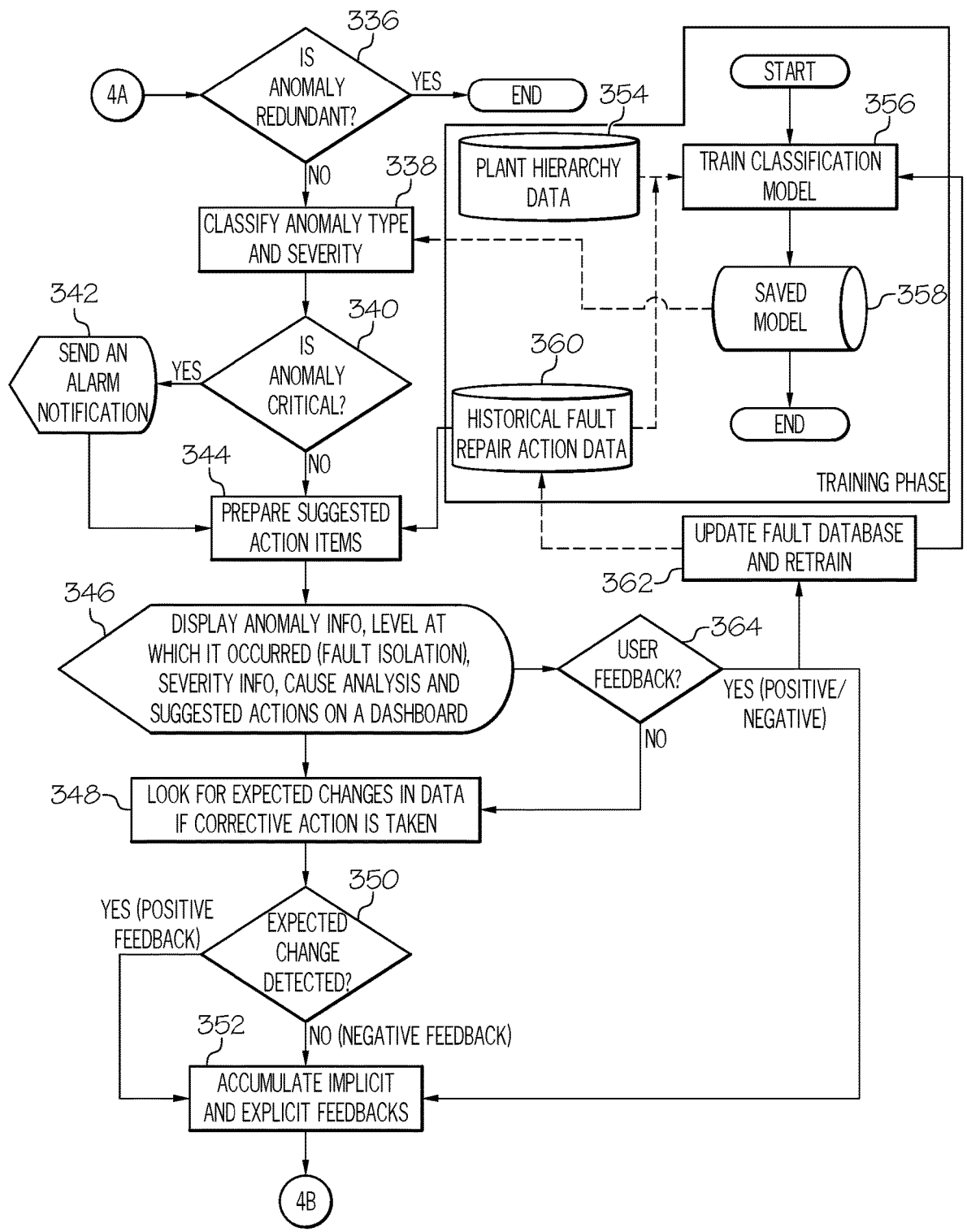

FIGS. 3A to 3C are a flowchart of operations for detecting an anomaly in a power network. FIGS. 3A to 3C illustrate a detailed flowchart of the predictive machine learning module 22, the anomaly detection module 224, and the anomaly scoring module 226 of FIG. 2. FIGS. 3A to 3C describe operations involved in detecting anomalies in a stream of power data. The power data may be preprocessed and entered into a pre-trained predictive deep learning based regression model which predicts the expected normal range of the data. Actual power data values that are received at the current time may be evaluated to determine if they fall within the normal range. If the current active power data usage is outside of the normal range, an anomaly may have occurred. The anomaly is scored based on how far the actual value lies relative to the predicted range. This mechanism of comparing current active power data to a predicted range is deployed at various levels in the facility metering hierarchy in order to attempt to identify a fault associated with the anomaly at a lower lever hierarchy.

Referring to FIG. 3A, a training phase 300 may include pre-processing 304, based on historical power data from a database 302. The pre-processed data is then used for training using a machine learning technique, such as Long Short Term Memory (LSTM) learning, to learn patterns in the historical data. The resulting model may be saved at block 308 and provided to a trained deep learning model 316. The data stream 314 of current active power usage may be pre-processed 312 and provided to the trained deep learning model 316. The output of the trained deep learning model 316 is used to determine prediction and confidence bounds for future power usage, at block 318. Some post-processing 320 may be performed on these prediction and confidence bounds and then a decision 322 may be made based on a comparison of the data stream 314 of current active power usage with the prediction and/or confidence bounds. If the data stream 314 of the current active power usage is outside of the confidence bounds, an anomaly score may be determined based on an error distance, at block 324.

The anomaly detection system may include two learning phases: an offline learning phase and an online learning phase. The offline learning phase includes learning baseline power usage for a given facility from its historical data. The offline learning phase may be referred to as a training phase 300, as shown in FIG. 3A. The online learning phase includes the system applying changes to the baseline model according to changes in behavior of power consumption by various elements in the facility.

The online learning phase may include event driven feedback and/or continuous learning. Event driven feedback utilizes implicit feedback (soft feedback) or explicit feedback (hard feedback) to trigger updates to the baseline model. The updates are triggered based on feedback received on reported anomalies through various feedback mechanisms. The feedback mechanisms may include explicit feedback directly from the user or operator, or implicit feedback by implicitly monitoring data for expected corrective changes. The implicit feedback may be less effective compared to explicit feedback due to time for the machine learning to converge. However, implicit feedback may be provided as a redundancy so that the explicit feedback is optionally available to the user. The implicit feedback being an optional feature ensures that the power system is capable of functioning without the human-in-the-loop factor. Explicit feedback and implicit feedback may both be used at the same time, or one of the two may be selected to control operations described herein. Continuous learning monitors for shifts in statistical properties of the data and/or the accuracy of the model over time to decide whether the baseline power usage needs to be updated to incorporate the changes in behavior at a particular hierarchy level, such as a device, section, building, or facility.

Referring now to FIG. 3B, the prediction and confidence bounds at block 318 is used to predict if the confidence prediction is consistently low or is repeatedly increasing negative feedback, at block 326. If this is the case, then the training pipeline is triggered with new data at block 328 using feedback information obtained from accumulating implicit and/or explicit feedbacks at block 352 of FIG. 3C.

Monitoring for improvement in the prediction confidence or for negative feedback is accomplished at block 330. If stable improvement is observed at block 332 then learning is discontinued. If stable improvement, i.e., a steady state, is not observed at block 332, then the system continues learning at block 334 in order to obtain an improved baseline power usage.

Reporting and feedback are provided to allow the user to interact with the overall system. The user may receive reports at an interface or display and may be able to provide feedback to the system to be used in the adaptive learning. FIG. 3C incorporates an additional machine learning model to further classify the detected anomalies into types and severity levels. This classifier may be a pre-trained model which is trained on a database of anomaly types and severity which can be obtained from the facility's historical records. This knowledge may be stored in a database which includes mappings from historical faults to their remedies or repair actions taken on them in the past.

Referring now to FIG. 3C, the anomaly score that was determined at block 324 may be evaluated to determine if an anomaly is redundant, at block 336. If the anomaly is determined not to be redundant, the anomaly type and/or severity may be classified, at block 338. If the anomaly is determined to be critical, at block 340, an alarm notification may be sent, at block 342. The alarm notification may include suggested action items, at block 344, based on historical fault information and repair actions that were undertaken, which are stored in a fault database 360. Information related to the anomaly may be provided or displayed, including a level in the hierarchy at which the anomaly occurred, fault isolation information pinpointing an element or a lower level of the anomaly, severity information, and/or suggested actions, at block 346. If user feedback 364 is not provided, the anomaly detection continues to look for expected changes in the power data responsive to the corrective action that was taken, at block 348. Based on the collective action taken and subsequent expected changes, at block 350, positive feedback or negative feedback are provided such that implicit and explicit feedback may be respectively accumulated, at block 352. These implicit and/or explicit feedbacks may then be provided to trigger the training pipeline, at block 328. User feedback 364 may also be a portion of the accumulated feedback, at block 352. The user feedback may be used to update the fault database 360 and/or retrain the anomaly classification system, at block 362. In some cases, the user feedback may be conflicting with the implicit feedback that is generated. The implicit feedback may be ignored or disabled in these cases. The fault database 360 that includes information about historical faults and subsequent repair action may be used to train a classification model 356 during the training phase. Facility hierarchy data from a database 354 may also be used to train the classification model 356. This classification model may be saved, at block 358, and used to classify anomaly type and/or severity, at block 338.

Figure 4:
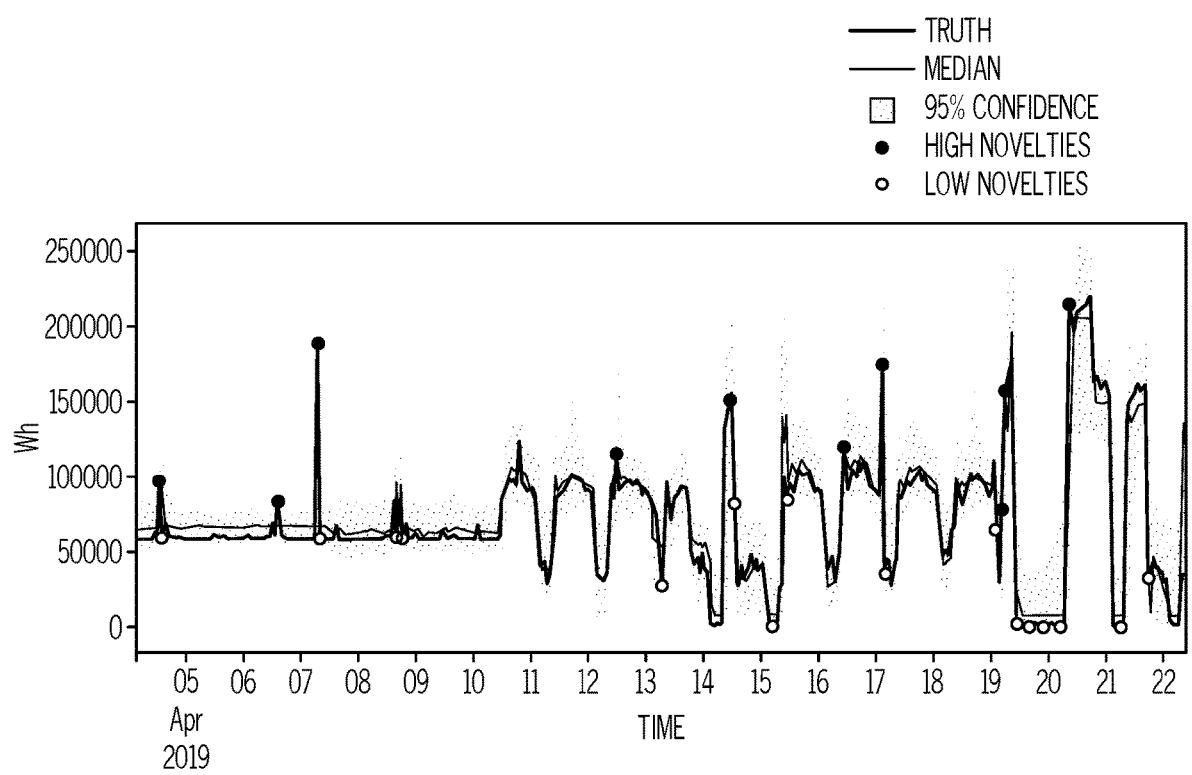
FIG. 4 is a graph of example anomalies of power consumption of a facility such as a manufacturing plant or data center, according to various embodiments described herein.

FIG. 4 is a graph of example anomalies of power consumption of a facility such as a manufacturing plant. Referring to FIG. 4, actual facility level power meter data over time is shown. The high novelty peaks are the points of abnormally high power consumption that have been identified by operations described with respect to the flowcharts of FIGS. 2, 3A, 3B, and/or 3C. Since the range of normal power usage is predicted, points of abnormally low consumption may also be identified. These low novelties are identified in this example graph, in addition to the high novelties. The anomalies may be determined at the facility of the power network, such as at the facility level. These anomalies identified at a facility level of FIG. 4 are then further evaluated to determine anomalies at lower hierarchy levels and potentially identify a fault at a particular element in the power network, as will be discussed with respect to FIGS. 5A to 5C.

Figure 5A:
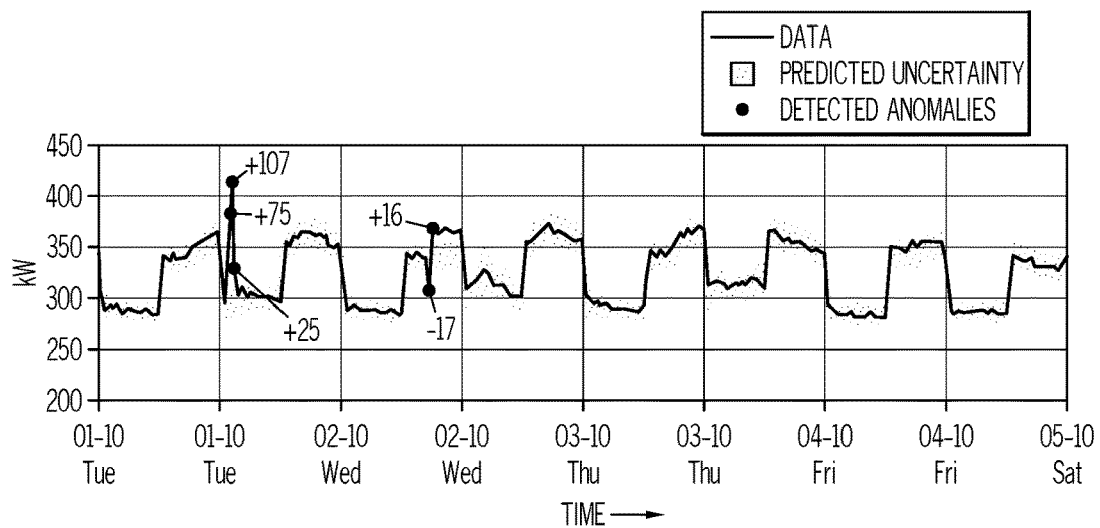
FIGS. 5A to 5C are graphs of example anomalies in various power metering levels, according to various embodiments described herein.
Figure 5B:
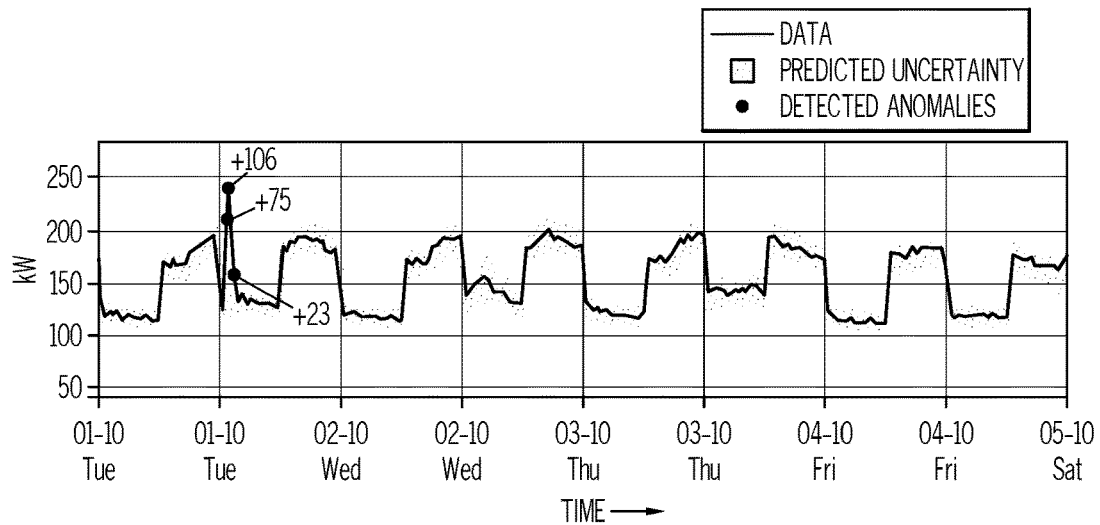
Figure 5C:
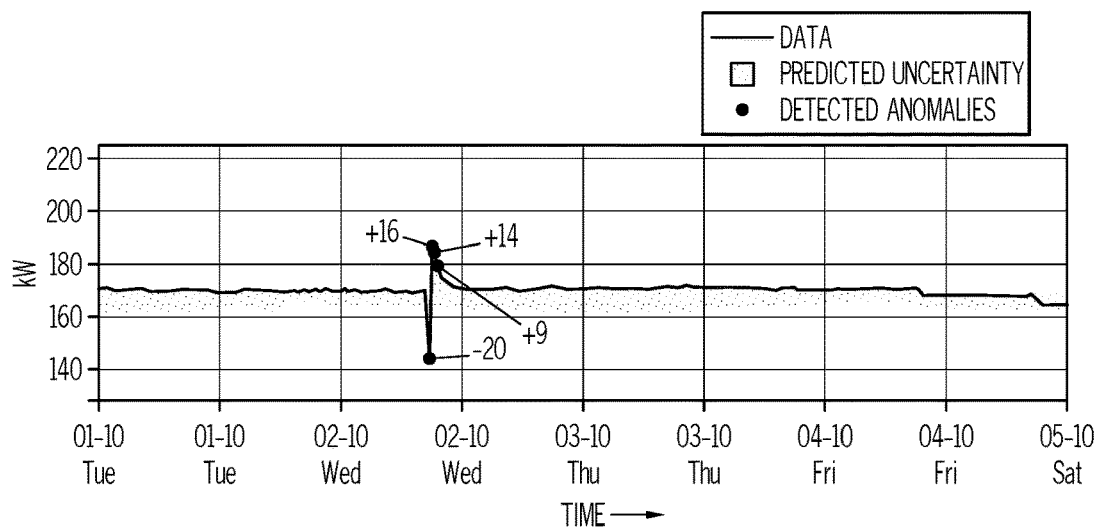

FIGS. 5A to 5C are graphs of example anomalies occurring at various power metering levels that are lower in hierarchy than the main meter hierarchy of FIG. 4. Referring to FIG. 5A, anomalies may be determined at a main meter hierarchy of the power network, such as at the building level hierarchy for one building of buildings 120a to 120n of FIG. 1. Point anomalies, labeled as detected anomalies in FIG. 5A, may be detected due to a sharp rise in the cross peak power. For example, a detected anomaly, as labeled in FIG. 5A, may be +107 above the predicted uncertainty while a different detected contextual anomaly is −17 below the predicted uncertainty. These detected anomalies may indicate that a sub-process at a lower level hierarchy may not be operating properly. For example, a section of the building may have an equipment failure that results in an anomaly based on lower than expected active power usage. As an additional example, a thermostat setting in a section of the building may have been changed that produces substantially lower or higher power usage, but may not maintain a proper operating temperature for equipment in that section of the building. According to some embodiments, anomalies may be found at a lower level in the hierarchy but the anomalies could be upstream, downstream, or neighbor devices. As such, anomalies may be diagnosed at a higher level hierarchy or at the same level in hierarchy.

Referring to FIG. 5B, anomalies at a lower level hierarchy than the main meter hierarchy of FIG. 5A, such as in the mechanical section of the building in the main meter hierarchy of FIG. 5A are illustrated. Anomalies are observed in this example at three times. Referring to FIG. 5C, anomalies at a lowest level hierarchy, which is lower than the mechanical section of FIG. 5B, are illustrated. The lowest level hierarchy may be the machine level or component level of FIG. 1. Although FIG. 1 illustrates four level hierarchies as a non-limiting example, fewer or greater hierarchies are possible. In the example of FIG. 5C, the power usage in the lowest level hierarchy may indicate anomalies in one or more IT machines. These detected anomalies in FIG. 5C may be isolated to a single IT machine in this example. This isolation of a single IT machine is accomplished by discovering anomalies at the main level meter of FIG. 5A and then working down to subsequent levels in the hierarchy in FIGS. 5B and 5C by running the operations of the flowcharts of FIGS. 3A to 3C at the lower levels and ultimately isolating the fault which led to overall spike in the main meter hierarchy in the lowest level. In the example of FIGS. 5A to 5C, an anomaly observed in the power demand measured by the top-level power quality main meter on the specific date of $2^{nd}$ of October in a particular data center was drilled down to a demand spike resulting from a specific sub level in the facility. This foregoing example illustrates the capability of the embodiments described herein to isolate the anomalies to a specific sub level without a human in the loop.

Detecting power anomalies may include operations such as using a predictive algorithm to estimate future power consumption as a precursor to anomaly detection. A detection mechanism based on the prediction and the actual consumption happening at the time of prediction may be used. A scoring mechanism based on a difference between the predicted and actual power consumption as well as criticality of the process being monitored may be used. Fault isolation activities to pin-point the location of the observed power anomaly may be utilized. A reporting mechanism may be needed to decide when and how to report the abnormal power consumption. The type and severity level of the detected anomaly may be identified. An adaptive learning module may adjust to dynamic shifts in the power consumption characteristics of the facility, building, section, machine, and/or component.

According to some embodiments, a data-driven approach may be used for learning normal power consumption patterns in the historical plant data. The learning mechanism may be a temporal pattern learning algorithm based on a deep learning architecture. The learning algorithm may be trained on the historical plant data and utilized as a predictive model during online deployment. The learning algorithm may function by predicting the expected power consumption in the next prediction horizon based on its acquired knowledge of facility behavior during training. The prediction horizon may be defined in terms of various time intervals such as the next hour, next day, next x minutes, etc. The predictive algorithm may also describe an uncertainty bound as the prediction. This uncertainty bound may be a learned quality and therefore may be a function of the power data available to the learning algorithm at the time of training. This uncertainty bound may help in determining the confidence of the learning algorithm prediction of the power consumption based on past data. According to some embodiments, the predictive algorithm learns a predicting range rather than a single point. The anomalous power consumptions may be detected if the actual power consumption, for which the prediction was made, is outside the uncertainty interval around that prediction.

In order to score the anomalies that have been identified as a measure of its severity in magnitude, the score may be determined as a function of two numerical quantities D1 and D2. D1 is defined as a distance which describes how far away the actual power consumption is from the predicted consumption value, while D2 is defined as the distance from the nearest uncertainty bound. D1, D2, or a combination thereof may be used to score the anomalies.

A mechanism to report the flagged anomalies is provided. The decision to send out a notification to the user or other concerned authority is made based on the anomaly score as well the criticality of the anomaly. The objective may be to minimize repeated reporting of multiple anomalies where anomalies occur at close intervals and are more likely to be triggered by a similar underlying cause.

According to various embodiments described herein, it may be determined whether the facility power consumption behavior has deviated significantly from the behavior that has been historically learned. The uncertainty bound may serve as an input to determining if sustained occurrence of increased uncertainty in prediction of consumed power implies that the behavior of the monitored physical entity has changed significantly from what was observed during the training. Sustained occurrence of uncertainty may trigger the secondary learning mechanism where the adaptive learning is used to incorporate the new knowledge of power usage. This secondary learning may feed into the reporting mechanism since a sustained change in behavior may imply degradation of the underlying physical component.

Adaptive online learning, which learns new behavior when new power data arrives and tunes the model parameters of the main predictive model to adjust to the new behavior in the power system. Adaptive online learning should be used cautiously since it alters the performance of the system to adjust for the new previously unseen data, which represents the shift in definition of the normal behavior, i.e., the baseline power usage.

An objective explicit feedback mechanism may be used to close the loop and learn from the inputs received from a user or operator. A GUI based dashboard that is interactive may enable the user or facility manager to receive status information, anomaly and/or fault information, and provide input mechanisms. An implicit feedback mechanism with no involvement from the user may be used such that the power data is monitored for changes following a detection of an anomaly and subsequent notification. The implicit feedback may feed into the adaptive online learning to update the model parameters.

When the operations described herein are applied at multiple levels of facility metering hierarchy, the system is able to leverage information specific to those levels for detecting anomalous consumption of power. For example, when applied at the machine level, the machine characteristics may be used as an input to the operations described herein, resulting in improved accuracy due to additional information availability. In this manner, fault isolation may be provided at individual levels, to identify at which level the anomaly has occurred and display such information to the user.

Figure 6:
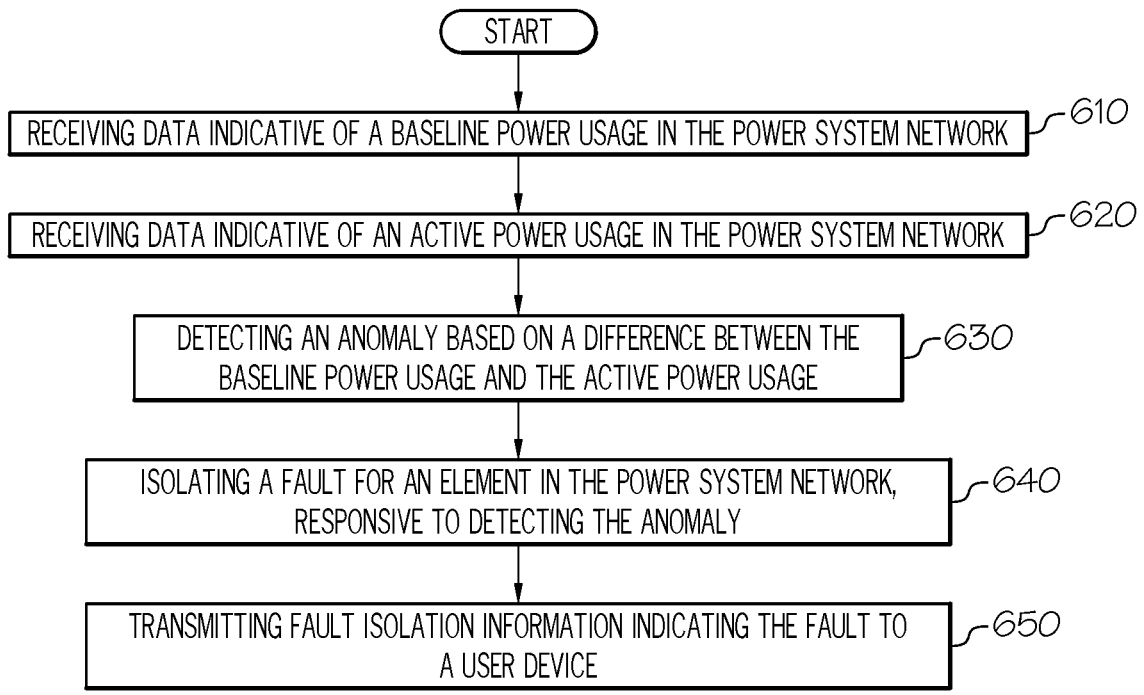
FIGS. 6 to 17 are flowcharts of operations for detecting anomalies in a power network, according to various embodiments described herein.

FIGS. 6 to 17 are flowcharts of operations for detecting anomalies in a power network, according to various embodiments described herein. Referring to FIG. 6, detecting an anomaly in a power network may include determining a baseline power usage in the power network, at block 610. Detecting the anomaly may include receiving data indicative of an active power usage in the power network, at block 620. The baseline power usage may be determined based on a predictive model, which, in turn, learns from historical data. The historical data may be stored in a database. The active power usage may be received from a power meter or other monitoring device associated with a facility. Detecting the anomaly may include detecting an anomaly based on a difference between the baseline power usage and the active power usage, at block 630. Detecting the anomaly may include isolating a fault for an element in the power network, responsive to detecting the anomaly, at block 640. Detecting the anomaly may include transmitting fault isolation information indicating the fault to a user device, at block 650.

Figure 7:
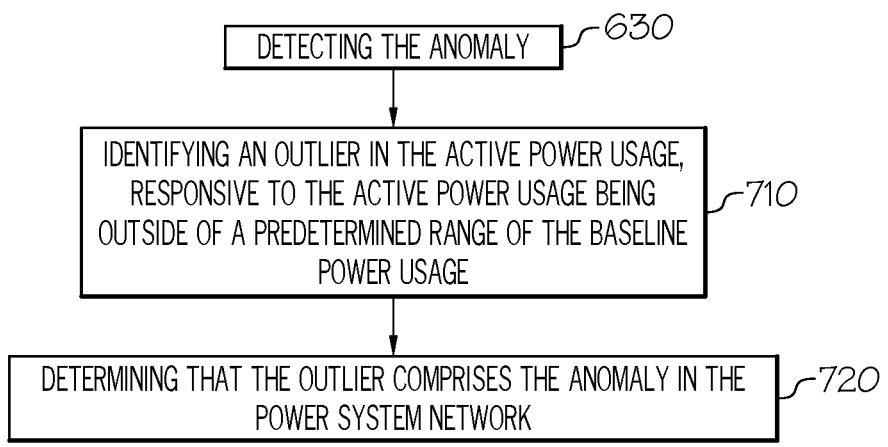

Referring to FIG. 7, detecting the anomaly may include identifying an outlier in the active power usage, responsive to the active power usage being outside of a predetermined range of the baseline power usage, at block 710. Detecting the anomaly may include determining that the outlier includes the anomaly in the power network, at block 720.

Figure 8:
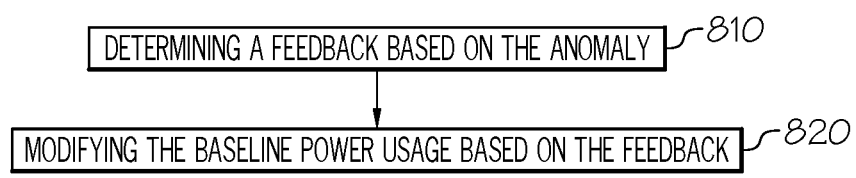

Referring to FIG. 8, operations may include determining feedback based on the anomaly, at block 810. Operations may include modifying the baseline power usage based on the feedback, at block 820.

Figure 9:
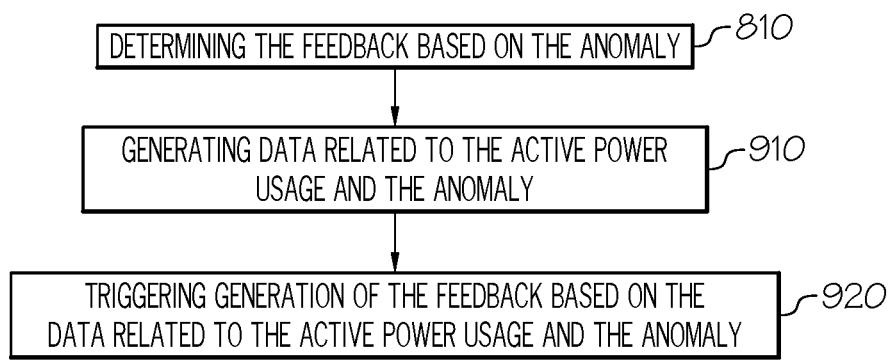

Referring to FIG. 9, determining the feedback based on the anomaly may include generating data related to the active power usage and the anomaly, at block 910. Determining feedback may include triggering generation of the feedback based on the data related to the active power usage and the anomaly, at block 920.

Figure 10:
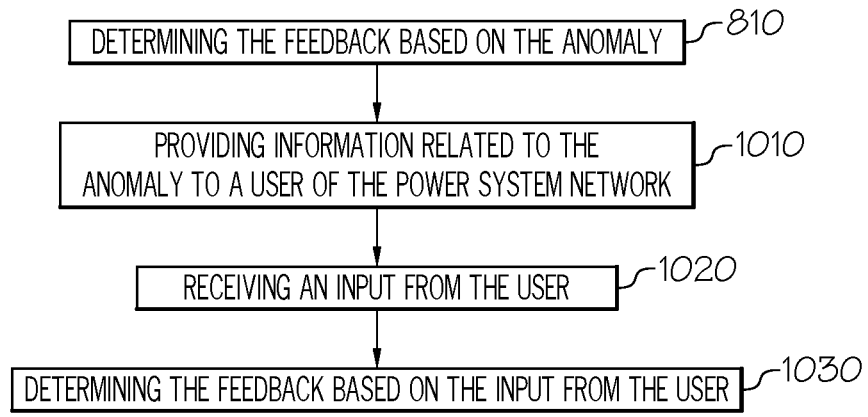

Referring to FIG. 10, determining the feedback based on the anomaly may include providing information related to the anomaly to a user of the power network, at block 1010. Determining feedback may include receiving an input from the user, at block 1020. Determining feedback may include determining the feedback based on the input from the user, at block 1030.

Figure 11:
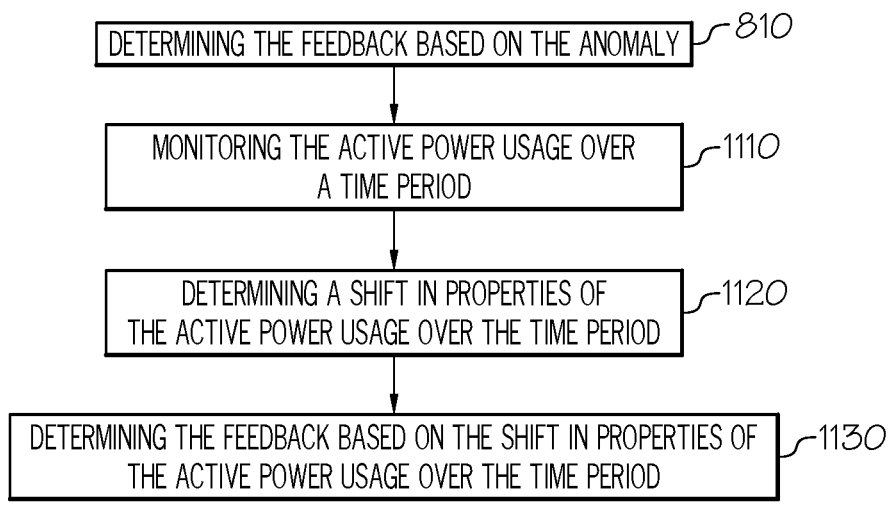

Referring to FIG. 11, determining the feedback based on the anomaly may include monitoring the active power usage over a time period, at block 1110. Determining feedback may include determining a shift in properties of the active power usage over the time period, at block 1120. Determining feedback may include determining the feedback based on the shift in properties of the active power usage over the time period, at block 1130. The power usage properties may be shifted and/or updated to new properties (i.e., mean shift). The feedback may trigger re-learning of the model. The element may be a building, a section, a machine, or a component.

Figure 12:
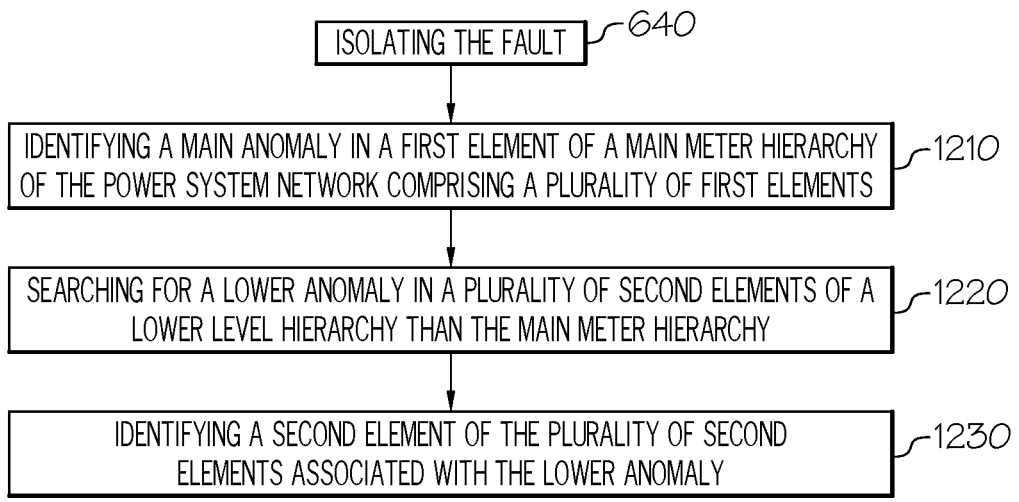

Referring to FIG. 12, isolating the fault may include identifying a main anomaly in a first element of a plurality of first elements of a main meter hierarchy of the power network, at block 1210. Isolating the fault may include searching for a lower anomaly in a plurality of second elements of a lower level hierarchy than the main meter hierarchy, at block 1220. The second elements are associated with the first element. Isolating the fault may include identifying a second element of the plurality of second elements associated with the lower anomaly, at block 1230.

Figure 13:
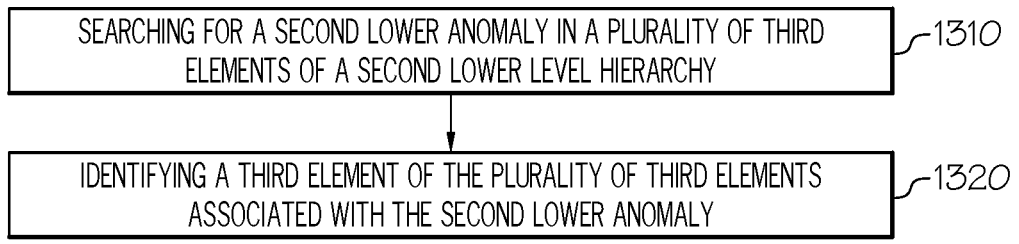

Referring to FIG. 13, isolating the fault may include searching for a second lower anomaly in a plurality of third elements of a second lower level hierarchy, at block 1310. The third elements are associated with the second element. Isolating the fault may include identifying a third element of the plurality of third elements associated with the second lower anomaly, at block 1320.

Figure 14:
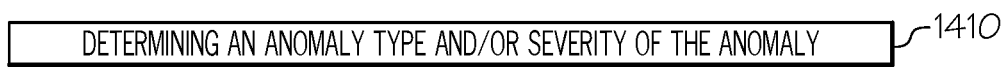

Referring to FIG. 14, detecting an anomaly may include determining an anomaly type and/or severity of the anomaly, at block 1410. The anomaly type may be associated with a repair action that was taken responsive to the isolating the fault. The severity of the anomaly may be obtained from a database that includes historical power usage data of the power network.

Figure 15:
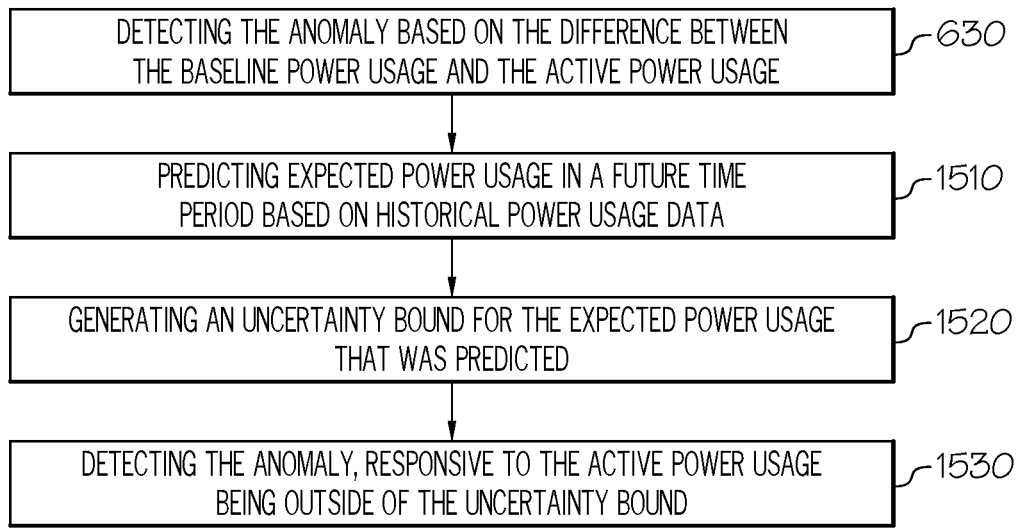

Referring to FIG. 15, detecting the anomaly based on the difference between the baseline power usage and the active power usage may include predicting expected power usage in a future time period based on historical power usage data, at block 1510. Detecting the anomaly based on the difference may include generating an uncertainty bound for the expected power usage that was predicted, at block 1520. The anomaly may be detected responsive to the active power usage being outside of the uncertainty bound, at block 1530.

Figure 16:
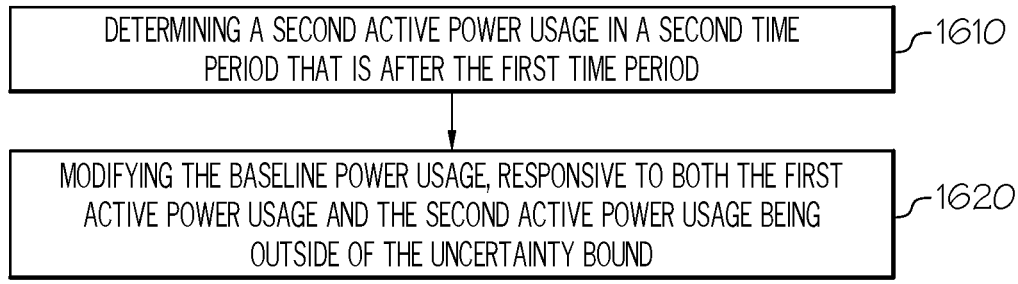

According to some embodiments, the active power usage may include a first active power usage in a first time period. Referring to FIG. 16, operations may further include determining a second active power usage in a second time period that is after the first time period, at block 1610. Operations may include modifying the baseline power usage, responsive to both the first active power usage and the second active power usage being outside of the uncertainty bound, at block 1620. Modifying the baseline power usage may include modifying the predictive machine learning model. The expected power usage may be predicted based on determining a temporal pattern in the historical power usage data.

Figure 17:
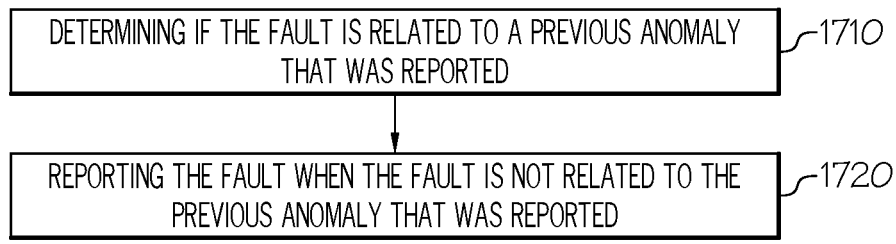

Referring to FIG. 17, operations may include determining if the fault is related to a previous anomaly that was reported, at block 1710. The fault may be reported when the fault is not related to the previous anomaly that was reported, at block 1720.

Figure 18:
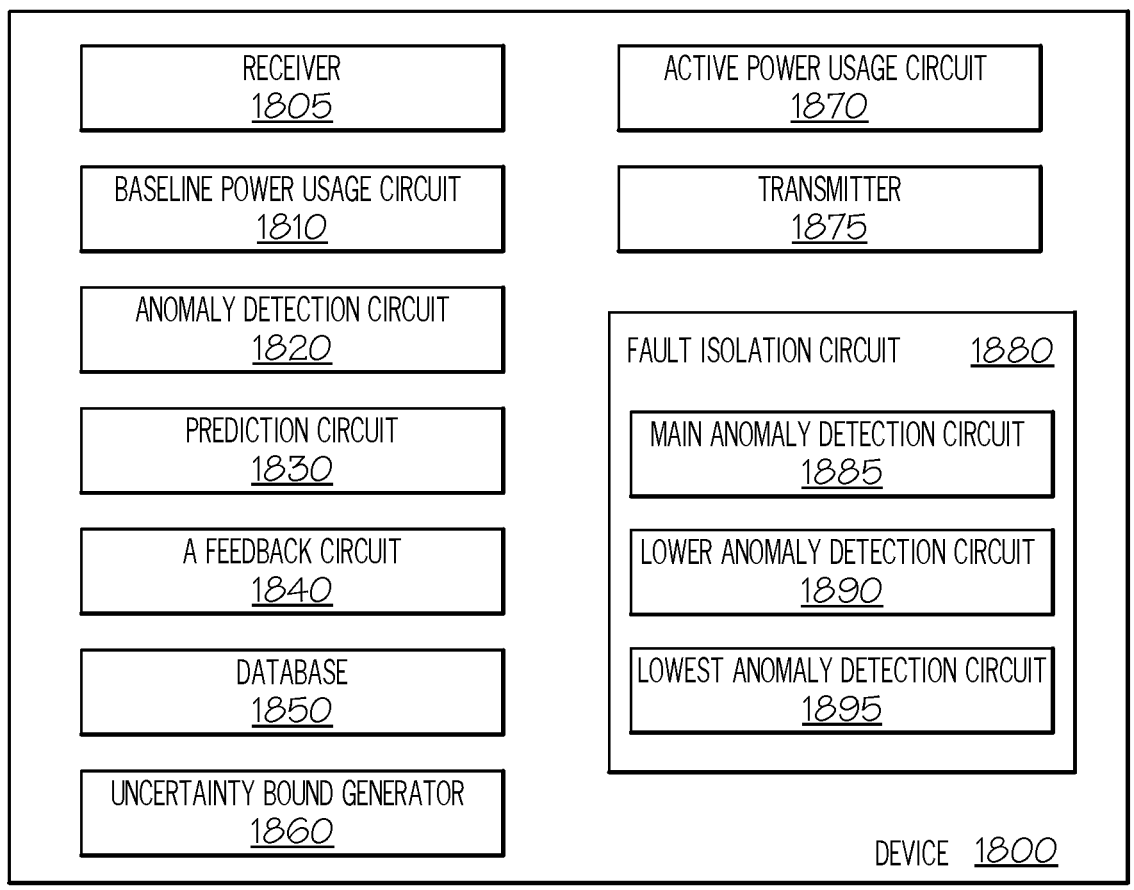
FIG. 18 is a block diagram of a device that may be included in the power network to perform operations of the flowcharts of FIGS. 2 to 3C and/or FIGS. 6 to 17, according to various embodiments described herein.

FIG. 18 is a block diagram of a device that may be included in the power network to perform operations of the flowcharts of FIGS. 2 to 3C and/or FIGS. 6 to 17. Referring to FIG. 18, device 1800 is configured to detect an anomaly in a power network. The device 1800 includes a baseline power usage circuit 1810 configured to determine baseline power usage in the power network, an active power usage circuit 1870 configured to determine active power usage in the power network, an anomaly detection circuit 1820 configured to detect an anomaly based on a difference between the baseline power usage and the active power usage, and a fault isolation circuit 1880 configured to isolate a fault for an element in the power network, responsive to detecting the anomaly. Device 1800 may include a receiver 1805 that receives baseline power usage information and/or active power usage information. Device 1800 may include a transmitter 1875 that transmits fault isolation information indicating the fault to a user device.

The fault isolation circuit 1880 may include a main anomaly detection circuit 1885 configured to identify a main anomaly in a first element of a main meter hierarchy of the power network, where the main meter hierarchy includes a plurality of first elements, and a lower anomaly detection circuit 1890 configured to search for a lower anomaly in a plurality of second elements of a lower level hierarchy than the main meter hierarchy and identify a second element of the plurality of second elements associated with the lower anomaly. The fault isolation circuit may include a lowest anomaly detection circuit 1895 configured to search for a lowest anomaly in a plurality of third elements of a lowest level hierarchy and identify a third element of the plurality of third elements associated with the lowest anomaly.

According to some embodiments, the device 1800 may include a database 1850 that stores historical power usage data, a prediction circuit 1830 configured to predict expected power usage in a future time period based on the historical power usage data, and an uncertainty bound generator 1860 configured to generate an uncertainty bound for the expected power usage that was predicted. The anomaly detection circuit may be further configured to detect the anomaly, responsive to the active power usage being outside of the uncertainty bound.

The device 1800 may include a feedback circuit 1840 configured to determine a feedback based on the anomaly. In some embodiments, the baseline power usage circuit 1810 may be further configured modify the baseline power usage based on the feedback.

Figure 19:
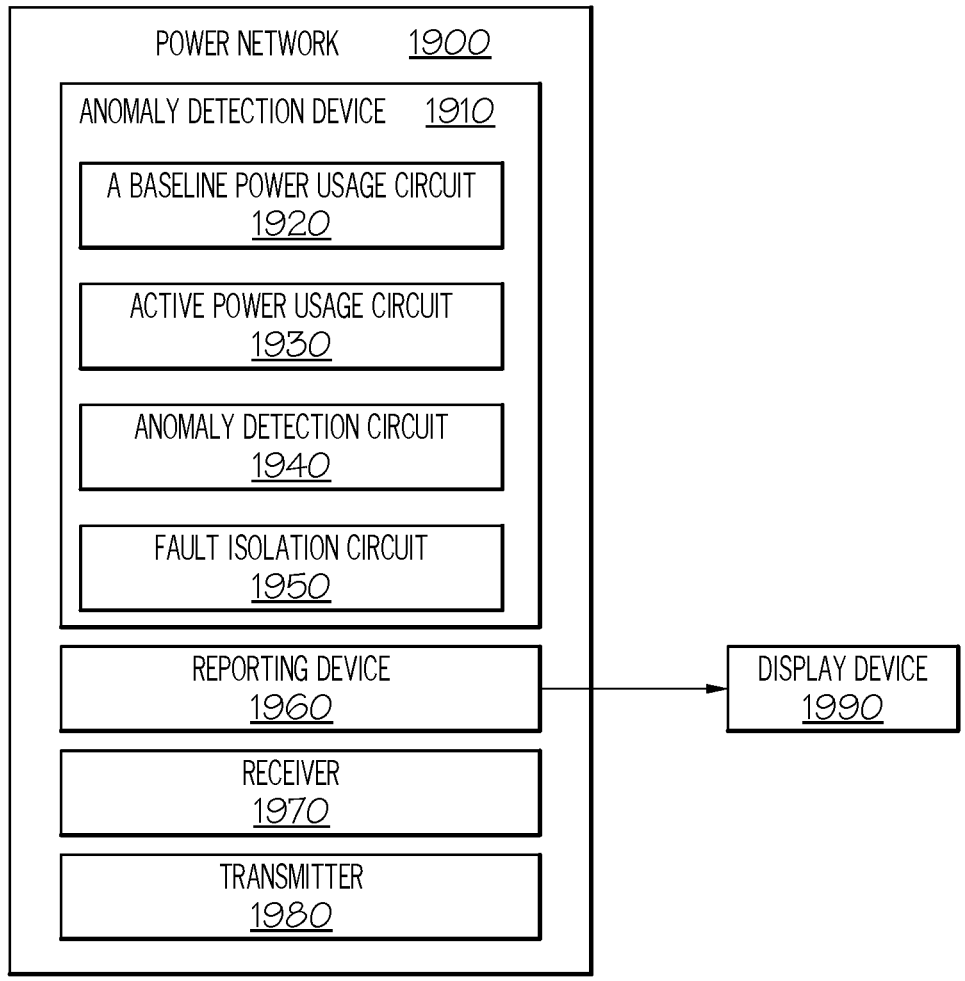
FIG. 19 is a block diagram of a power network that may perform the operations of the flowcharts of FIGS. 2 to 3C and/or FIGS. 6 to 17, according to various embodiments described herein.

FIG. 19 is a block diagram of a power network that may perform the operations of the flowcharts of FIGS. 2 to 3C and/or FIGS. 6 to 17. Referring to FIG. 19, a power network 1900 may include an anomaly detection device 1910. The anomaly detection device 1910 may include a baseline power usage circuit 1920 configured to determine a baseline power usage in the power network, an active power usage circuit 1930 configured to determine an active power usage in the power network, an anomaly detection circuit 1940 configured to detect an anomaly based on a difference between the baseline power usage and the active power usage, and a fault isolation circuit 1950 configured to isolate a fault for an element in the power network, responsive to detecting the anomaly. The power network 1900 may include a reporting device 1960 configured to provide an indication of the fault to a display device 1990. The power network 1900 may include a receiver 1970 and/or a transmitter 1980 that communicate with a facility, power metering devices, users, operators, and/or a display device configured to provide fault information.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry,", "a circuit" "a module", "a unit" or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A method for detecting an anomaly in a power network, the method comprising: determining a baseline power usage in the power network; receiving data indicative of an active power usage in the power network; detecting an anomaly based on a difference between the baseline power usage and the active power usage; isolating a fault for an element in the power network, responsive to detecting the anomaly; transmitting fault isolation information indicating the fault to a user device; determining a feedback based on the anomaly; and modifying the baseline power usage based on the feedback, wherein the element is at a lower level hierarchy of the power network than the anomaly, wherein isolating the fault comprises: identifying, with a main anomaly detection circuit, a main anomaly in a first element of a main meter hierarchy of the power network comprising a plurality of first elements; searching, with a lower anomaly detection circuit, for a lower anomaly in a plurality of second elements of the lower level hierarchy that is lower than the main meter hierarchy, wherein the plurality of second elements are associated with the first element; and identifying, with the lower anomaly detection circuit, a second element of the plurality of second elements associated with the lower anomaly, wherein determining the feedback based on the anomaly comprises: generating data related to the active power usage and the anomaly; and triggering generation of the feedback based on the data related to the active power usage and the anomaly.

2. The method of claim 1, wherein the lower anomaly comprises a first lower anomaly, and wherein the lower level hierarchy comprises a first lower level hierarchy, the method further comprising: searching for a second lower anomaly in a plurality of third elements of a second lower level hierarchy, wherein the plurality of third elements are associated with the second element; and identifying a third element of the plurality of third elements associated with the second lower anomaly, wherein the second lower level hierarchy is at a lower level in the power network than the first lower level hierarchy.

3. The method of claim 1, wherein the detecting the anomaly comprises: identifying an outlier in the active power usage, responsive to the active power usage being outside of a predetermined range of the baseline power usage; and determining that the outlier comprises the anomaly in the power network.

4. The method of claim 1, wherein determining the feedback based on the anomaly comprises: providing information related to the anomaly to a user of the power network; receiving an input from the user; and determining the feedback based on the input from the user.

5. The method of claim 1, wherein determining the feedback based on the anomaly comprises: monitoring the active power usage over a time period; determining a shift in properties of the active power usage over the time period; and determining the feedback based on the shift in properties of the active power usage over the time period.

6. The method of claim 1, wherein the element comprises a building, a section, a machine, or a component.

7. The method of claim 1, further comprising: determining an anomaly type and/or severity of the anomaly, wherein the anomaly type is associated with a repair action taken, responsive to the isolating the fault, and wherein the severity of the anomaly is obtained from a database comprising historical power usage data of the power network.

8. The method of claim 1, wherein the detecting the anomaly based on the difference between the baseline power usage and the active power usage comprises: predicting expected power usage in a future time period based on historical power usage data; generating an uncertainty bound for the expected power usage that was predicted; and detecting the anomaly, responsive to the active power usage being outside of the uncertainty bound.

9. The method of claim 8, wherein the active power usage comprises a first active power usage in a first time period, the method further comprising: determining a second active power usage in a second time period that is after the first time period; and modifying the baseline power usage, responsive to both the first active power usage and the second active power usage being outside of the uncertainty bound.

10. The method of claim 8, wherein the expected power usage is predicted based on determining a temporal pattern in the historical power usage data.

11. The method of claim 1, further comprising: determining if the fault is related to a previous anomaly that was reported; and reporting the fault when the fault is not related to the previous anomaly that was reported.

* * * * *